(12) United States Patent
Sarnoff et al.

(10) Patent No.: US 10,814,375 B2
(45) Date of Patent: Oct. 27, 2020

(54) STEAM TABLE PAN

(71) Applicant: HFA, INC., Wheeling, IL (US)

(72) Inventors: Norton Sarnoff, Northbrook, IL (US); Brad Sarnoff, Chicago, IL (US); Raj Patel, Kildeer, IL (US)

(73) Assignee: HFA, Inc., Wheeling, IL (US)

( * ) Notice: Subject to any disclaimer, the term of this patent is extended or adjusted under 35 U.S.C. 154(b) by 350 days.

(21) Appl. No.: 15/151,608

(22) Filed: May 11, 2016

(65) Prior Publication Data
US 2017/0326618 A1    Nov. 16, 2017

(51) Int. Cl.
*B21D 51/18*    (2006.01)
*A47J 36/02*    (2006.01)
*B21D 51/44*    (2006.01)

(52) U.S. Cl.
CPC .......... *B21D 51/18* (2013.01); *A47J 36/022* (2013.01); *B21D 51/44* (2013.01)

(58) Field of Classification Search
CPC .... B21D 51/18; B21D 51/22; B21D 51/2615; B21D 51/2646; B21D 51/44; A47J 27/12; A47J 27/122; A47J 27/14; A47J 27/16; A47J 36/022; A47J 39/0006; A47J 39/02
See application file for complete search history.

(56) References Cited

U.S. PATENT DOCUMENTS

| | | | | |
|---|---|---|---|---|
| 2,481,384 A | * | 9/1949 | Blackwell | A47J 39/02 219/439 |
| 2,928,552 A | * | 3/1960 | Gomersall | A47J 39/006 211/85.4 |
| 3,089,450 A | * | 5/1963 | Lyon, Jr. | B21D 51/22 126/376.1 |
| 3,144,974 A | * | 8/1964 | Eichner | B21D 22/201 220/575 |
| 3,545,645 A | * | 12/1970 | Smith | A47J 36/022 220/573.1 |
| 3,850,340 A | * | 11/1974 | Siemonsen | B21D 51/10 220/658 |

(Continued)

OTHER PUBLICATIONS

Steam Table, steam table with half pans from website https://www.amazon.com/Daily-Aluminum-Steam-Table-36ct/dp/B00M0CSMJ2, Mar. 17, 2015.*

(Continued)

*Primary Examiner* — Edward T Tolan
(74) *Attorney, Agent, or Firm* — Adam K. Sacharoff; Much Shelist, P.C.

(57) ABSTRACT

In accordance with one embodiment of the invention, there is provided an improved disposable aluminum pan for use with a chaffing rack and a pair of half pans. The pan includes a base terminating to a sidewall and a rim, which terminates to a rolled bead. The pan includes an inside length measured longitudinally across opposing sidewalls from the inside edge of the rim. The inside length is configured to be longer than a corresponding inside length of an unimproved pan. The pair of half pans when nested side by side in the improved pan can have adjacent sides of the half pans lay without overlap. The pan also allows for a lid to fit better. The pan also includes a deeper well such that the bottom is positioned closer to burners in the chaffing rack and allows more water to be added during the heating process.

1 Claim, 8 Drawing Sheets

(56) References Cited

U.S. PATENT DOCUMENTS

| | | | | |
|---|---|---|---|---|
| 4,195,747 | A * | 4/1980 | Hare | A21B 3/134 220/23.2 |
| 4,530,440 | A * | 7/1985 | Leong | A47J 36/022 220/201 |
| 4,616,762 | A * | 10/1986 | Alexander | A47J 36/022 206/503 |
| 5,467,697 | A * | 11/1995 | Hunziker | A47J 27/10 126/33 |
| 6,199,715 | B1 * | 3/2001 | Hayes | A47J 36/022 206/564 |
| 6,293,458 | B1 * | 9/2001 | Sarnoff | A47J 36/022 220/573.1 |
| 6,415,945 | B1 * | 7/2002 | Zank | A47J 27/12 206/499 |
| 6,653,602 | B2 * | 11/2003 | Li | A47J 37/0623 219/386 |
| 7,866,503 | B2 * | 1/2011 | Liebzeit | A47J 27/16 220/573.1 |
| 8,079,302 | B2 * | 12/2011 | Giangrasso | A47J 27/122 126/275 R |
| 9,795,241 | B2 * | 10/2017 | Tosdale | A47J 27/16 |
| 2002/0020304 | A1 * | 2/2002 | Reynolds | A47J 36/24 99/339 |
| 2006/0081627 | A1 * | 4/2006 | Shei | A47J 27/004 219/771 |
| 2013/0186903 | A1 * | 7/2013 | Leonard | A47J 27/002 220/574 |
| 2017/0172324 | A1 * | 6/2017 | Torre | A47J 36/24 |

OTHER PUBLICATIONS

Office Action from Canadian copending application, App. No. CA2937960; dated Feb. 22, 2018.
Amazon.com Printout of Daily Chef Aluminum Foil Steam Pans, Half Size.; dated Mar. 7, 2015.

* cited by examiner

STEAM TABLE PAN

FIELD OF THE INVENTION

The present invention relates to the art of steam pans and similar items, and more particularly, the present invention is directed to properly nesting steam pans to help alleviate accidents by the consumer.

BACKGROUND OF THE INVENTION

Steam pans are typically foil pans used by consumers to keep food warm while catering and serving individuals. The steam pans utilize a bottom pan that is placed on a rack which lifts the bottom pan off the surface at a distance which permits the user to place candles or burners under the pan to keep the pan warm. Water is then placed in the bottom pan, which is heated by the burners. A smaller pan or multiple smaller pans with food are then nested within the bottom pan. The burners which are warming the water will then keep the food warm/hot while it is being served to the consumer. The problems with the current system are easily identified as the prior art is explained.

SUMMARY OF THE INVENTION

In accordance with one embodiment of the present invention, there is provided a method of manufacturing an improved disposable aluminum steam table pan for use with a chaffing rack with burners and for use, in at least one instance, with a pair of half pans. The prior art half pans include a bottom terminating to a continuous sidewall, and each half pan further include a top portion with a rim that terminates to a rolled bead. The problem in the art is that when the pair of half pans are nested side by side within an unimproved steam table pan, the rolled beads of adjacent sides of the pair of half pans are forced to overlap. As such, the improvement is defined to cover a method of forming the improved disposable aluminum steam table pan.

The formed improved disposable aluminum steam table pan includes a bottom base terminating to an upwardly extending continuous sidewall. The method further forms an outstanding rim, from a top portion of the continuous sidewall, which terminates to a rolled bead. The improved disposable aluminum steam table pan includes an inside length measured longitudinally across opposing sidewalls from the inside edge of the outstanding rim of said opposing sidewalk and configuring the inside length of the improved disposable aluminum steam table pan to be longer than a corresponding inside length of an unimproved steam table pan, such that the pair of half pans when nested side by side in the improved disposable aluminum steam table pan the rolled beads of adjacent sides of the pair of half pans lay side by side without overlap.

The method further forms the improved disposable aluminum steam table pan with an outside length measured longitudinally across opposing sidewalls from the outside edge of the outstanding rim of said opposing sidewalls. The outside length is further configured to be the same as the corresponding outside length of an unimproved steam table pan such that a lid that secures about the unimproved steam table pan is still configurable to secure about the improved steam table pan with the nested side by side half pans positioned inside the improved steam table pan.

In yet another aspect, the improved disposable aluminum steam table pan is formed with a continuous sidewall longer than a continuous sidewall that is formed on the unimproved steam table pan such that when the improved disposable aluminum steam table pan is positioned in a chaffing rack, the bottom base is closer to burners defined by a chaffing rack. In this instance when the half pans are nested within the improved disposable aluminum steam table pan the improved disposable aluminum steam table pan forms a larger well to hold more water than the unimproved disposable aluminum steam table pan.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 1A:
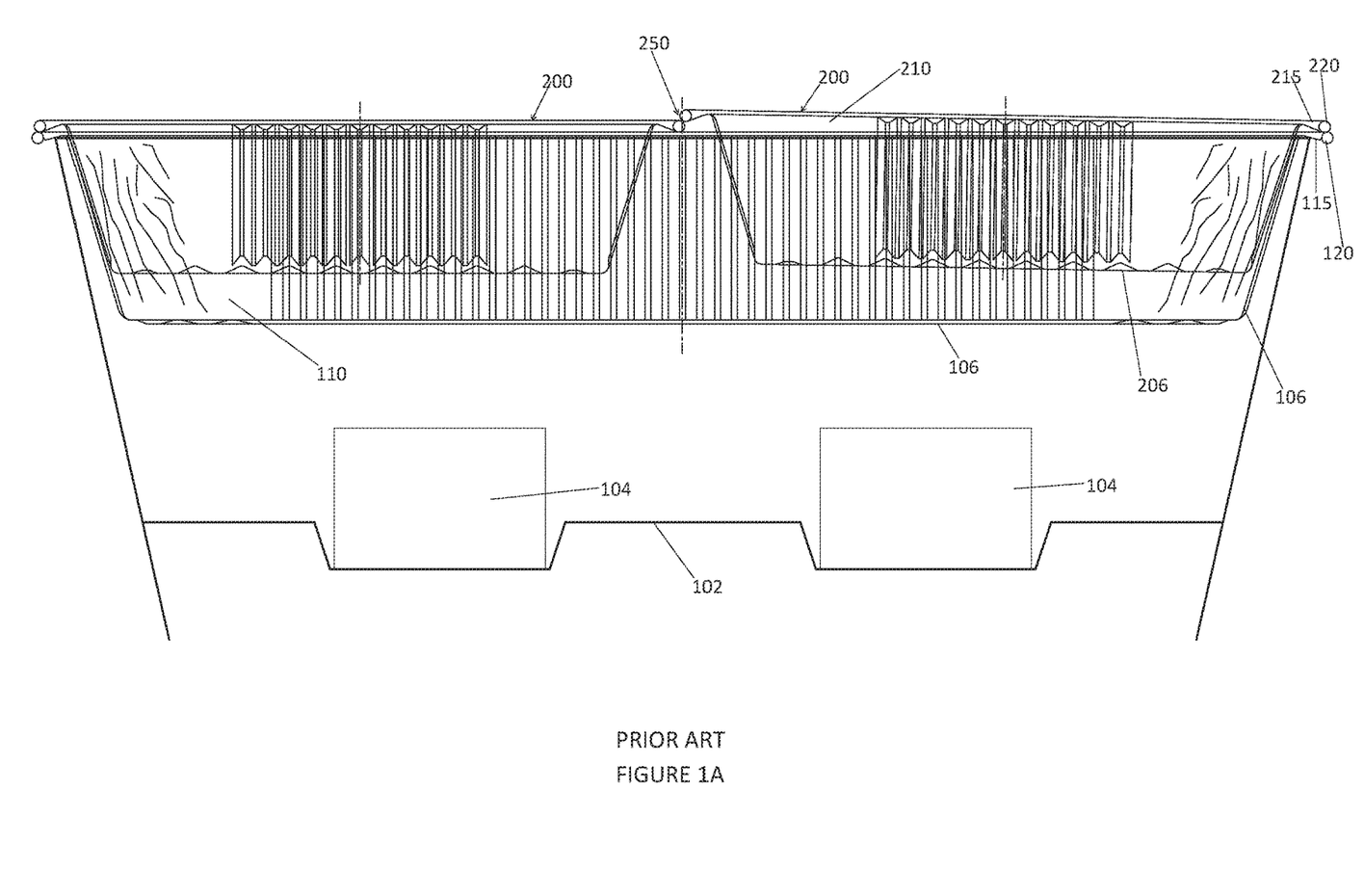
FIG. 1A is a side view of a prior art steam pan sized to be positioned in a chaffing rack as the bottom pan and shown with half pans placed therein.
Figure 1B:
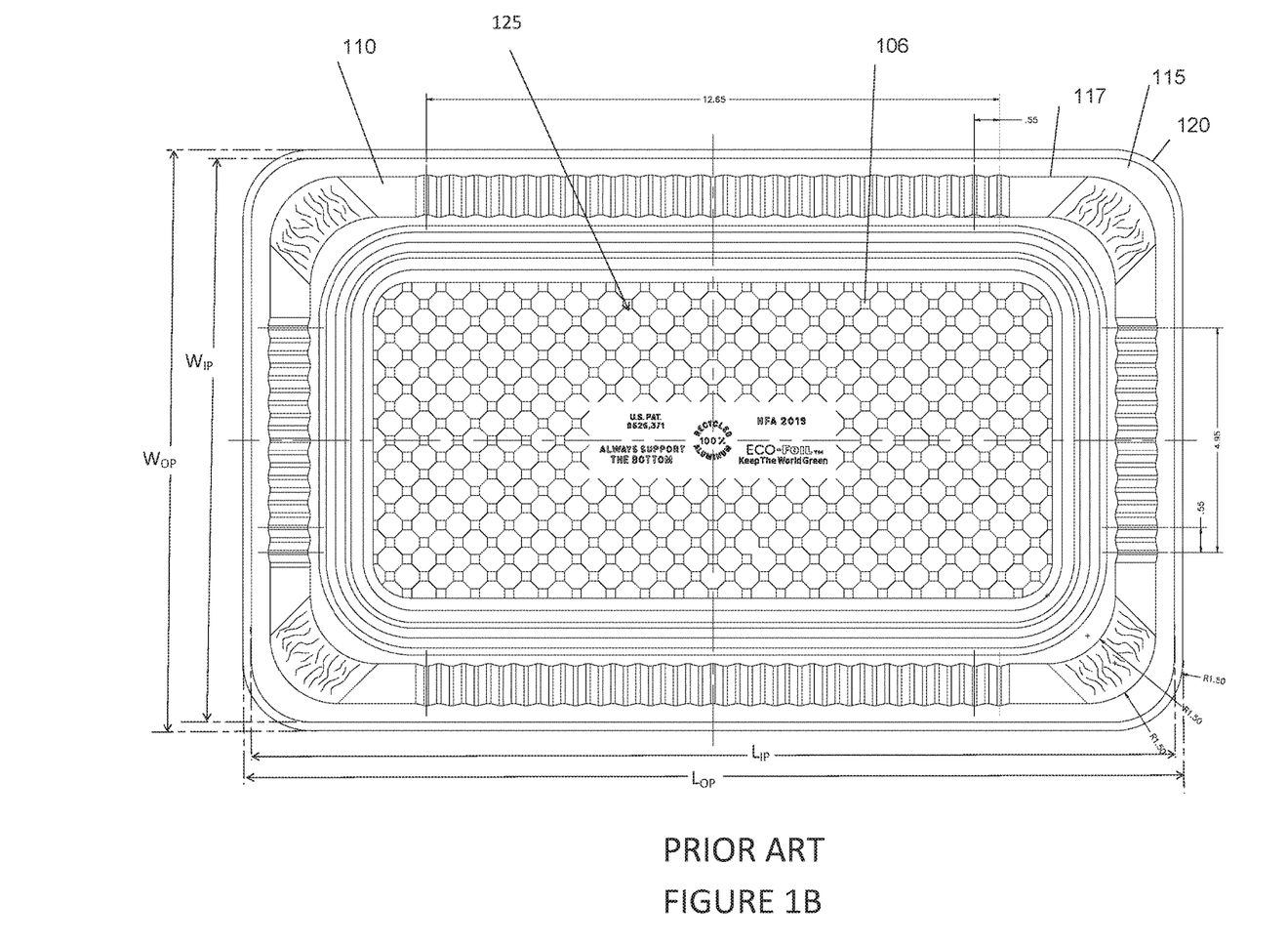
FIG. 1B is a top plan view of the prior art steam pan.
Figure 1C:
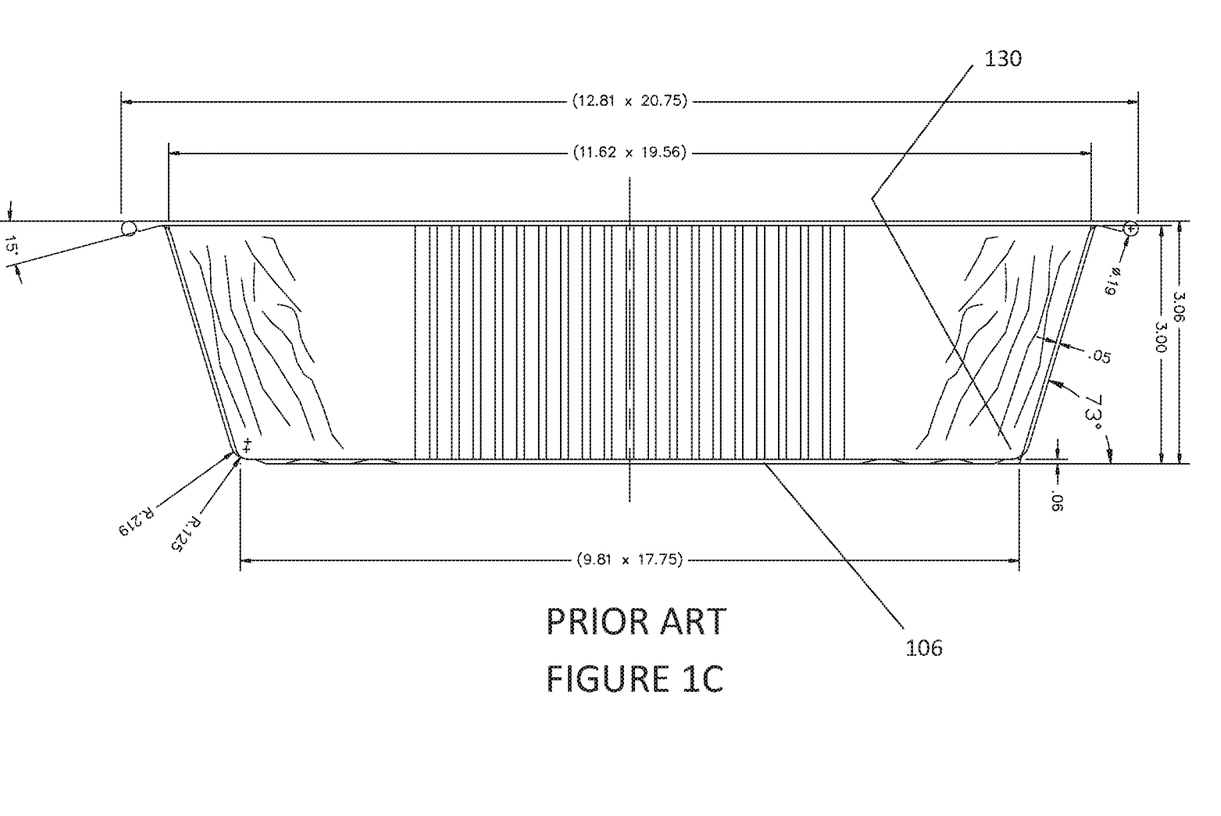
FIG. 1C is a side view of the prior art steam pan.
Figure 1D:
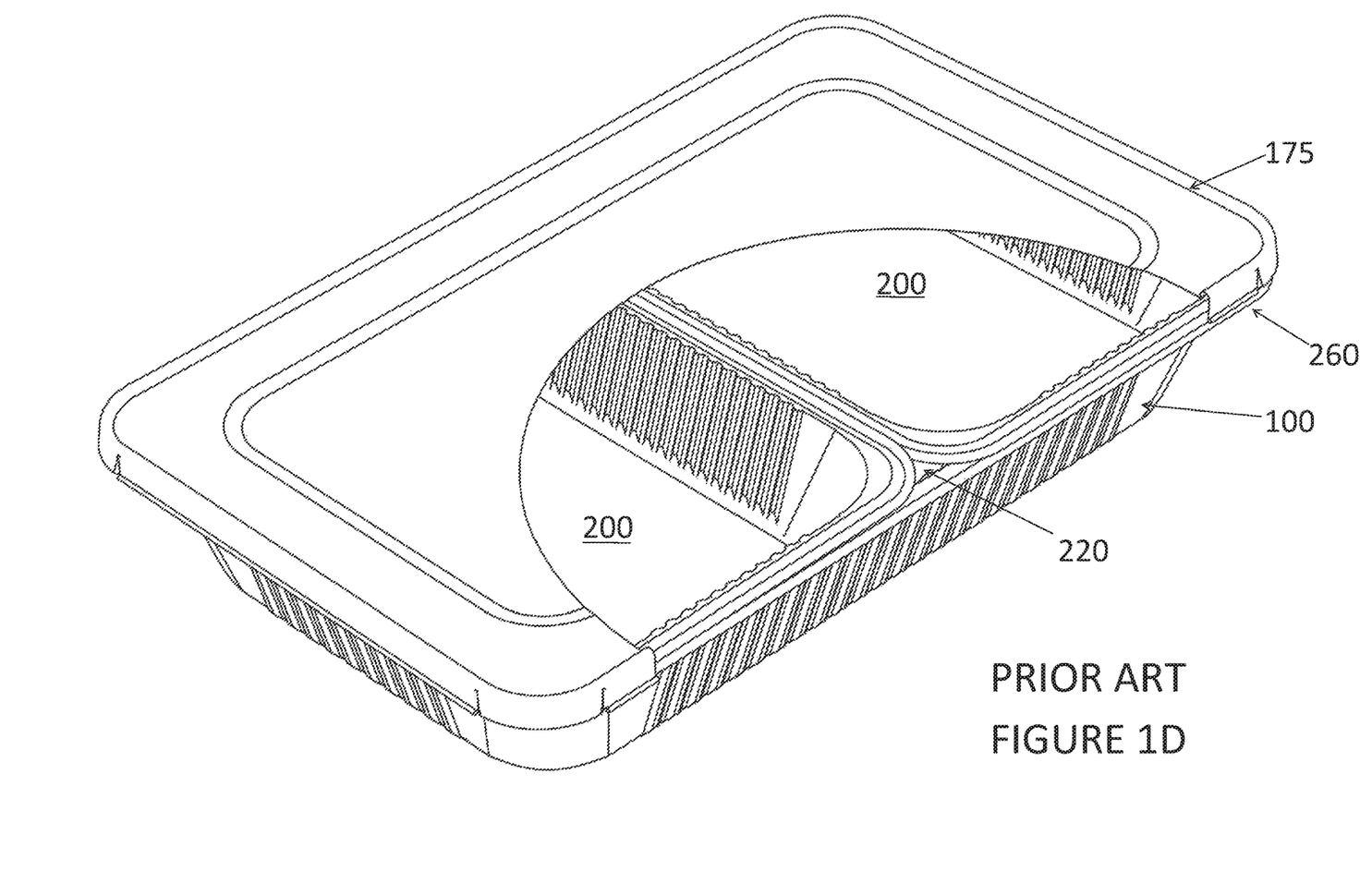
FIG. 1D perspective view of the prior art steam pan with half pans placed therein and shown with a lid.

With reference to Prior Art FIGS. 1A through 1D, there is provided a steam pan 100 sized to be positioned as a bottom pan that typically rests on a chaffing rack 102 and which permits the user to place a burner 104 or candle underneath the steam pan 100. The steam pan 100 includes a bottom base 106 that terminates to an upwardly extending continuous sidewall 110. Surrounding a top portion of the sidewall 110 is an outstanding rim 115 that terminate to a rolled bead 120. The pan is typically made of stamped aluminum. The approximate dimensions of the bottom base are 9.81"× 17.75" and the approximate dimensions of the interior 125 of the bottom pan taken from the inside edge 117 of the outstanding rim 115 is 11.62"×19.56" (also as shown in FIG. 1B as the inside length $L_{IP}$ extending from the inside edge of the outstanding rim compared to the outside length $L_{OP}$ that extends from the outside edge of the outstanding rim and the inside width $W_{IP}$ extending from the inside edge of the outstanding edge and outside width $W_{OP}$ that extends from the outside edge of the outstanding rim. With a height of approximately 3 inches the inside angle 130 between the bottom base 105 and the upwardly extending continuous sidewall 110 is about 107°.

Continuing to refer to Prior Art Figures there is also shown a pair of typical half pans 200 well known and used in the cooking industry. The half pans 200 are known for being approximately half the size of the steam pan. The half pan 200 includes a half pan base 205 that terminates to an upwardly extending continuous half pan sidewall 210. Surrounding a top portion of the half pan sidewall 210 is an outstanding half pan rim 215 that terminates to a half pan rolled bead 220.

The main problems with the current system are shown in Prior Art FIG. 1A, the half pans simply do not fit properly when situated side by side. As shown, the dimensions are such that the half pan beads 220 will overlap each other (250) causing one pan to sit at an angle from the other pan. This aspect can cause spills and accidents, which when dealing with hot food can burn and injury the consumer. In addition and as shown in the Prior Art Figures since the half pans do not sit properly a lid 175 that is designed to fit around the outstanding rim 115 of the steam pan 100 often times does not seal properly, region 260, over the half pans because the overlap of the beads 220. Again, this can lead to spills and burns to the consumer. Lastly, another issue is the depth of the steam pan 100. It has been found that since the steam pan is not deep enough problems can occur in cooking and in placing the half pans. If too much water is added, the half pans rest on top of the water and will be pushed too high to properly seal with a lid. Secondly, if not enough water is added the food may not cook or heat properly because the burners do not have enough water to heat.

Having outlined the problems in the prior art, the present invention is thus directed to a new and novel steam pan illustrated in FIGS. 2A through 2D and generally referenced as numeral 300. The new steam pan is created to (a) ensure proper fitting of two half pans without overlap of the beads, (b) utilize existing lid sizes to avoid having to develop a new lid, and (c) drop the base so it is lower and closure to the burners 104 allowing for better heating and more water.

The new steam pan 300 is created similarly to the prior art steam pan, in that the new steam pan 300 includes a bottom base 306 that terminates to an upwardly extending continuous sidewall 310. Surrounding a top portion of the sidewall 310 is an outstanding rim 315 that terminates to a rolled bead 320. The pan is typically made of stamped aluminum. The approximate dimensions of the bottom base are 9.21"× 17.25" and the approximate dimensions of the interior 325 of the new steam pan taken from the inside edge 317 of the outstanding rim 315 is 11.62"×19.66". Thus providing a 0.1 difference in interior dimension from the prior art. The outer dimension of the new steam pan is 12.81"×20.75" which is the same outer dimension of the prior art steam pan, thus ensuring the lid will still fit properly. The rolled bead 320 angle from the top of the pan to the bottom of the bead has been increased from 19 degrees in the prior art steam pan to 20 degrees in the new steam pan. This represents increased bead strength and helps secure the lid to the pan and will increase the strength of the pan when the consumer lifts the pan. The height of the new pan has been increased to approximately 4 inches, however the inside angle 330 between the bottom base 305 and the upwardly extending continuous sidewall 310 remains at about 107°.

Figure 2A:
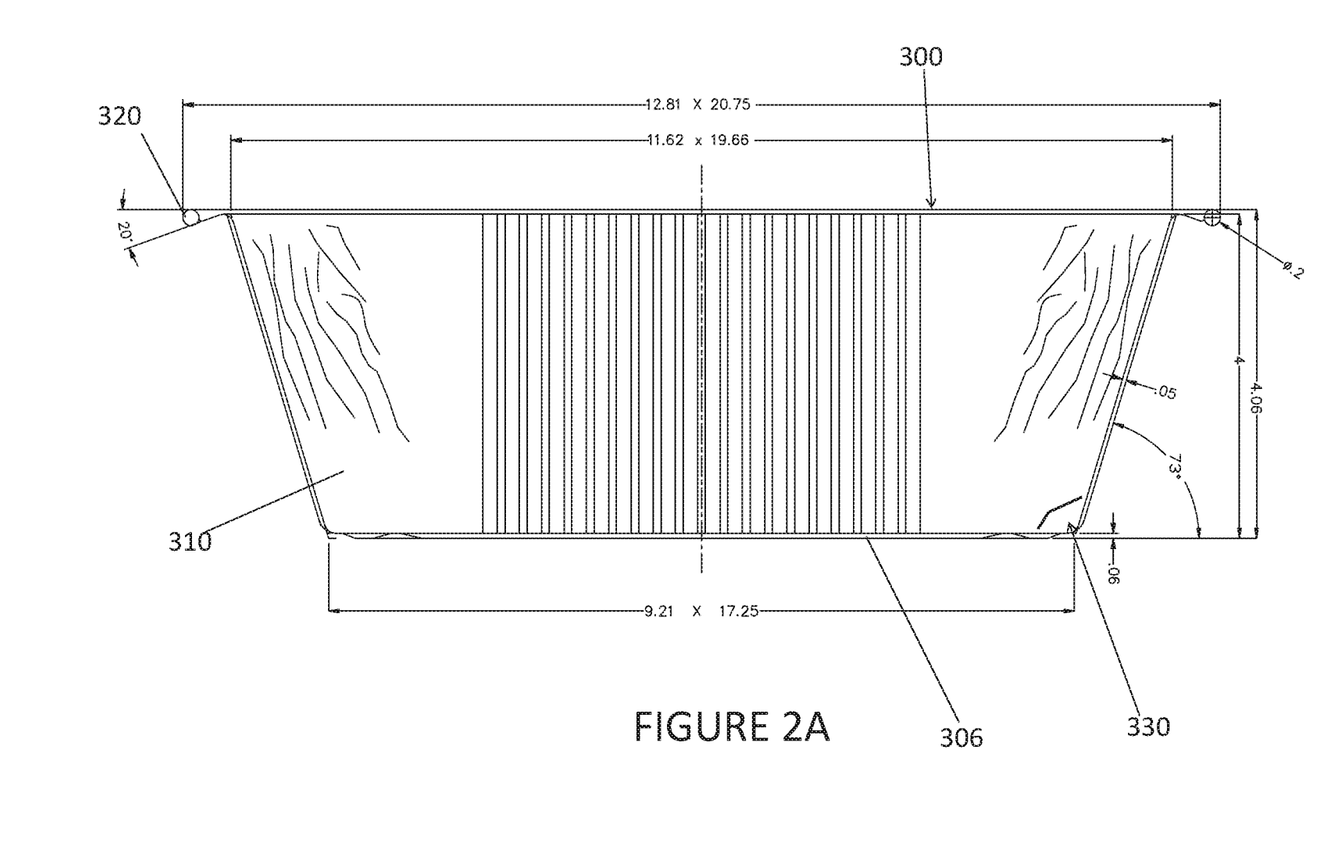
FIG. 2A is a side view of a steam pan in accordance with an embodiment of the present invention.
Figure 2B:
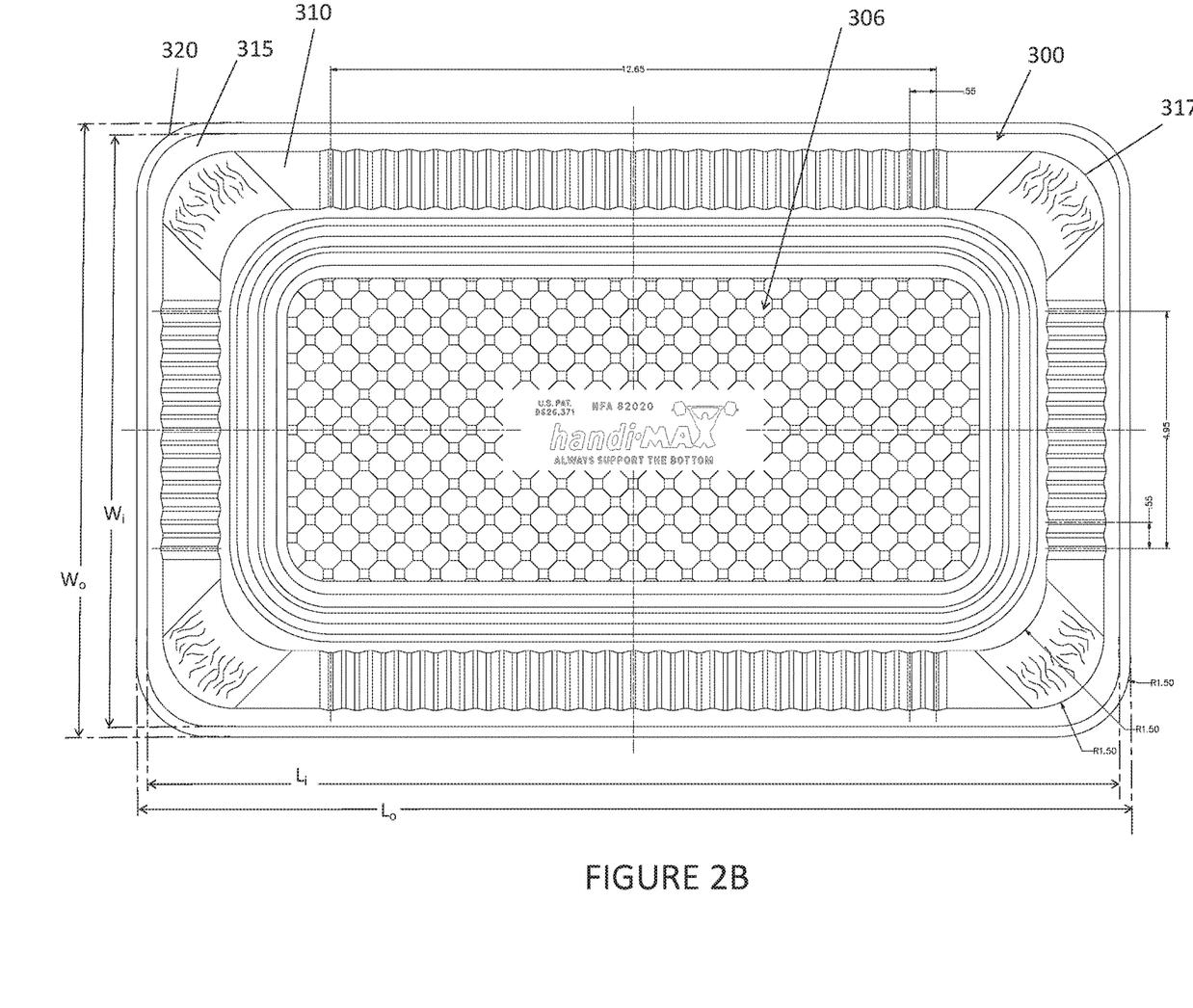
FIG. 2B is a top plan view of a steam pan in accordance with an embodiment of the present invention.
Figure 2C:
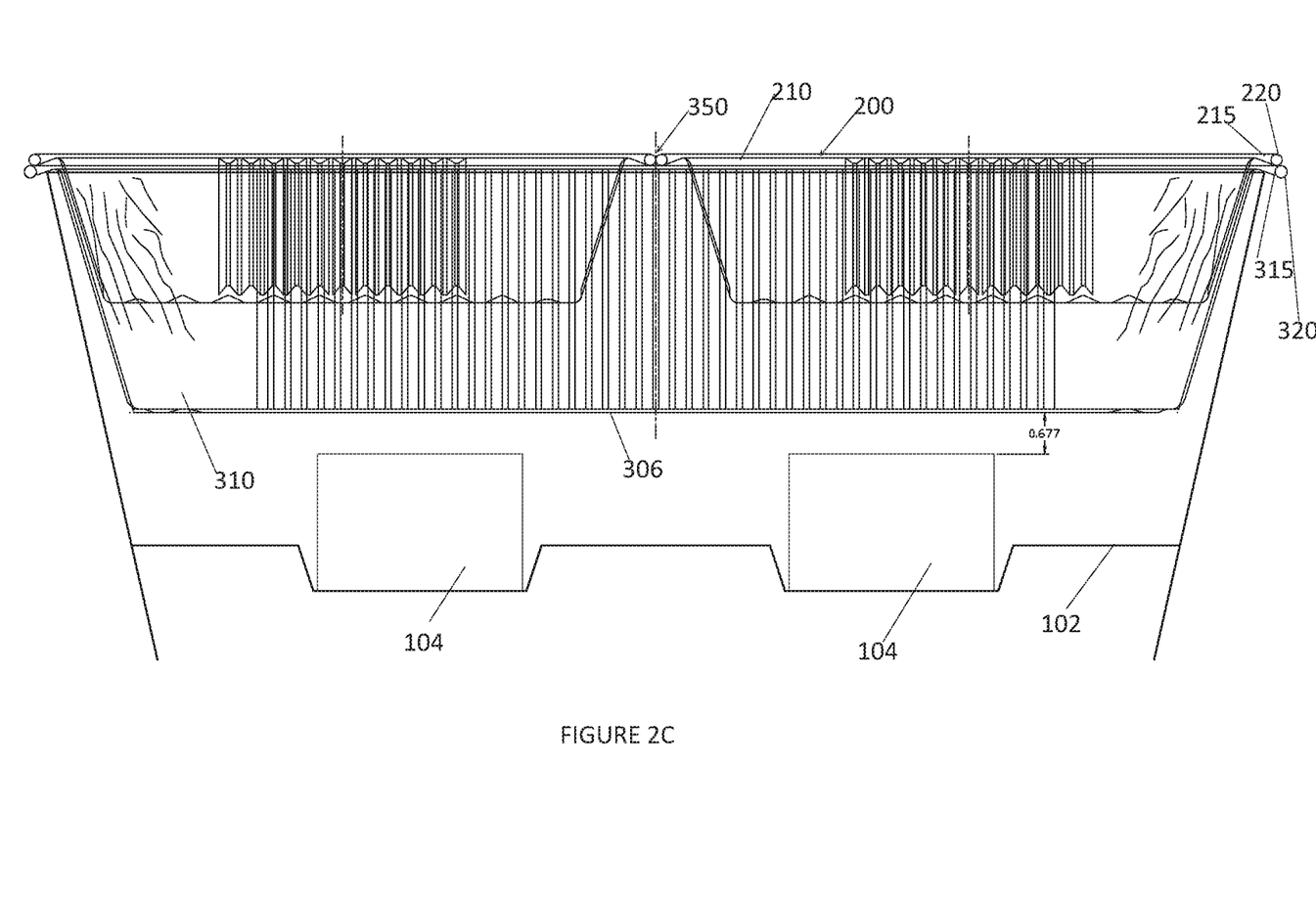
FIG. 2C is a side view of a steam pan in accordance with an embodiment of the present invention with a pair of half pans placed therein and shown on a chaffing rack.

Continuing to refer to FIGS. 2A-2C, the new steam pan 300 is illustrated resting in the chaffing rack 102. With the increased wall depth, the bottom 306 now rests closer to the burners 104, between ½" and ¾" from the burner. In addition, the change in the inside dimensional length $L_i$ of the new steam pan while maintaining the outside dimensional length $L_o$, this is also done while maintaining the internal angle of 73 degrees between the sidewall and the bottom of the pan.

Figure 2D:
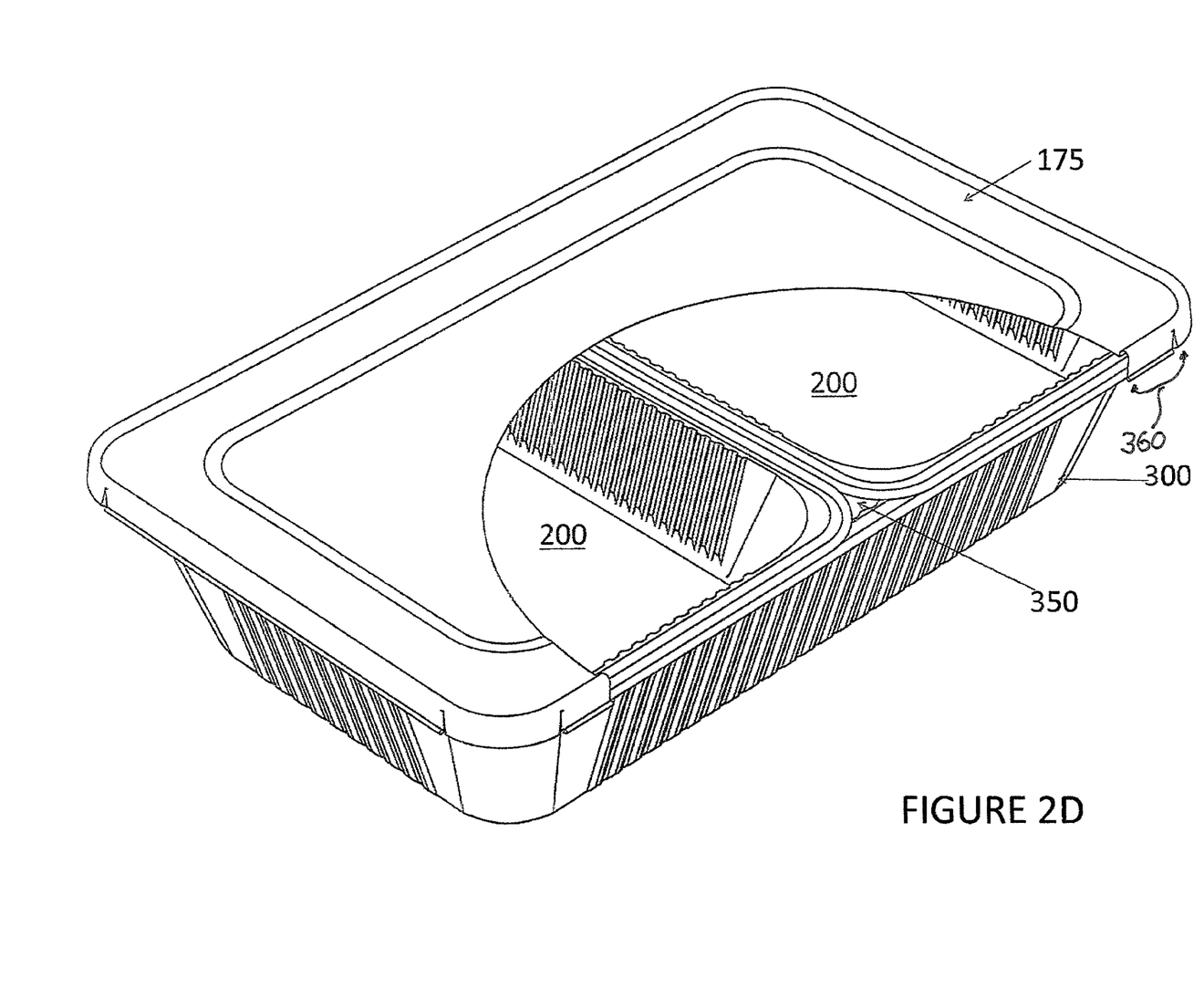
FIG. 2D is a perspective view of a steam pan in accordance with an embodiment of the present invention and shown with a lid.

By changing this aspect of the new steam pan, the two half pans when inserted into the new steam pan will lay side by side without overlapping the beads, reference 350 FIG. 2C. In addition, by keeping the same outside dimensional length $L_o$ the existing lids will fit properly and the lid 175 can properly secure the two half pans inside (FIG. 2D, region 360). Lastly, the extended sidewall allows more water into the new steam pan for better heating and heat transfer to the half pans. With less of a gap between the bottom and the burners, the new steam pan will heat faster and with less flame conserving fuel. All of these advantages provides for a greater consumer product that is safer to use.

In accordance with one embodiment of the present invention there is provided a method of manufacturing an improved disposable aluminum steam table pan for use with a chaffing rack with burners and for use, in at least one instance, with a pair of half pans. The prior art half pans include a bottom terminating to a continuous sidewall, and each half pan further include a top portion with a rim that terminates to a rolled bead. The problem in the art is that when the pair of half pans are nested side by side within an unimproved steam table pan, the rolled beads of adjacent sides of the pair of half pans are forced to overlap. As such, the improvement is defined to cover a method of forming the improved disposable aluminum steam table pan.

The formed improved disposable aluminum steam table pan includes a bottom base terminating to an upwardly extending continuous sidewall. The method further forms an outstanding rim, from a top portion of the continuous sidewall, which terminates to a rolled bead. The improved disposable aluminum steam table pan includes an inside length measured longitudinally across opposing sidewalls from the inside edge of the outstanding rim of said opposing sidewalls and configuring the inside length of the improved disposable aluminum steam table pan to be longer than a corresponding inside length of an unimproved steam table pan, such that the pair of half pans when nested side by side in the improved disposable aluminum steam table pan the rolled beads of adjacent sides of the pair of half pails lay side by side without overlap.

The method further forms the improved disposable aluminum steam table pan with an outside length measured longitudinally across opposing sidewalls from the outside edge of the outstanding rim of said opposing sidewalls. The outside length is further configured to be the same as the corresponding outside length of an unimproved steam table pan such that a lid that secures about the unimproved steam table pan is still configurable to secure about the improved steam table pan with the nested side by side half pans positioned inside the improved steam table pan.

In yet another aspect, the improved disposable aluminum steam table pan is formed with a continuous sidewall longer than a continuous sidewall that is formed on the unimproved steam table pan such that when the improved disposable aluminum steam table pan is positioned in a chaffing rack, the bottom base is closer to burners defined by a chaffing rack. In this instance when the half pans are nested within the improved disposable aluminum steam table pan the improved disposable aluminum steam table pan forms a larger well to hold more water than the unimproved disposable aluminum steam table pan.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method of manufacturing an improved disposable aluminum steam table pan for use with a disposable aluminum steam pan lid and a chaffing rack with burners, and for use with a pair of disposable aluminum half-pans, wherein each disposable aluminum half-pan, of the pair of disposable aluminum half-pans, is defined as being one-half of a length of the improved disposable aluminum steam table pan, and include a continuous half-pan sidewall extending from a half-pan bottom and terminating to a half-pan top portion with a half-pan rim that forms into a half-pan rolled bead, and the half-pan rolled bead further extends along outer facing sides and extends along inner facing adjacent sides of the half-pan when the pair of disposable aluminum half-pans are adjacently positioned within the improved disposable aluminum steam table pan, and wherein the disposable aluminum steam pan lid is configured to have a single continuous lid top with a defined peripheral top edge and a bendable skirt depending from and extending entirely around the peripheral top edge, the improvement comprises:

forming the improved disposable aluminum steam table pan with a bottom base terminating to an upwardly extending continuous sidewall;

forming an outstanding rim, from a top portion of the continuous sidewall, which terminates to a rolled bead; and forming an improved inside volume of the improved disposable aluminum steam table pan measured longitudinally across opposing sidewalls along an inside surface of the upwardly extending continuous sidewall said opposing sidewalls, and wherein the opposing sidewalls are configured to extend at an improved angle from the bottom base whereby the improved inside volume is configured to nest the pair of disposable aluminum half-pans such that when the pair of disposable aluminum half-pans are nested side by side in the improved disposable aluminum steam table pan, the rolled beads of inner facing adjacent sides of the pair of disposable aluminum half-pans lay side by side without overlap; and forming the improved disposable aluminum steam table pan with an outside length measured longitudinally across opposing sidewalls from the outside edge of the outstanding rim of said opposing sidewalls and configuring the outside length such that the rolled beads along outer facing sides of the pair of disposable aluminum half-pans lay fully inside the rolled bead of the improved disposable aluminum steam table pan at the same time as the rolled beads of inner facing adjacent sides of the pair of disposable aluminum half-pans lay side by side without overlap;

whereby the improved disposable aluminum steam table pan being configured to receive and nest the pair of disposable aluminum half-pans entirely within the rolled bead of the outstanding rim of the improved disposable aluminum steam table pan is thereby finally configured to receive the disposable aluminum steam pan lid in a manner that the single continuous lid top, when positioned onto the improved disposable aluminum steam table pan, secures the bendable skirt entirely under the rolled bead of the improved disposable aluminum steam table pan while completely securing entirely around the nested pair of disposable aluminum half-pans fully positioned inside by bending the bendable skirt of the disposable aluminum steam pan lid around and under the rolled bead of the improved disposable aluminum steam table pan.

* * * * *